(12) United States Patent   (10) Patent No.: US 9,283,816 B1
Laurita   (45) Date of Patent: Mar. 15, 2016

(54) METHOD AND APPARATUS FOR MELTING SNOW OR ICE NEAR TIRES

(71) Applicant: Joseph N. Laurita, Wayne, NJ (US)

(72) Inventor: Joseph N. Laurita, Wayne, NJ (US)

( * ) Notice: Subject to any disclaimer, the term of this patent is extended or adjusted under 35 U.S.C. 154(b) by 0 days.

(21) Appl. No.: 14/467,084

(22) Filed: Aug. 25, 2014

(51) Int. Cl.
*E01H 5/10* (2006.01)
*B60C 19/00* (2006.01)

(52) U.S. Cl.
CPC ............... *B60C 19/00* (2013.01); *E01H 5/106* (2013.01)

(58) Field of Classification Search
CPC ........... E01H 5/10; E01H 5/102; E01H 5/106; E01H 1/08; E01H 1/10; E01H 1/0809; E01H 1/0863; E01H 1/0872; E01H 1/108
USPC ............................................................ 37/227
See application file for complete search history.

(56) References Cited

U.S. PATENT DOCUMENTS

| | | | | |
|---|---|---|---|---|
| 2,325,901 | A * | 8/1943 | Atkinson | B60H 1/00271 126/271.1 |
| 3,289,668 | A * | 12/1966 | Drucker | B60B 39/023 126/271.1 |
| 4,063,606 | A * | 12/1977 | Makinson | 180/271 |
| 4,203,423 | A * | 5/1980 | Ricci | 126/271.1 |
| 4,324,307 | A * | 4/1982 | Schittino et al. | 180/313 |
| 4,848,510 | A * | 7/1989 | Ahmed | 180/309 |
| 5,100,175 | A * | 3/1992 | Swallow | B60B 39/023 239/567 |
| 5,301,996 | A * | 4/1994 | Theis | B60B 39/026 180/903 |
| 5,350,035 | A * | 9/1994 | Bodier | B60B 39/025 180/197 |
| 6,488,217 | B1 * | 12/2002 | Donastorg | 239/131 |
| 6,848,726 | B1 * | 2/2005 | Horsham | 291/3 |
| 6,946,621 | B1 * | 9/2005 | Roseman | 219/202 |

FOREIGN PATENT DOCUMENTS

DE   102008058919 A1 *  4/2010   ............ B60B 39/027

* cited by examiner

*Primary Examiner* — Thomas B Will
*Assistant Examiner* — Joan D Misa
(74) *Attorney, Agent, or Firm* — Walter J. Tencza, Jr.

(57) ABSTRACT

An apparatus including piping, a junction device connected to a first opening of the piping, and a switch device configured to cause the junction device to open or close the first opening of the piping. The apparatus may further include means for attaching the piping, the junction device, and the switch device to a vehicle such that a second opening of the piping is located nearer a first tire of the vehicle than to any other tire of the vehicle, and the first opening of the piping is located nearer an engine of the vehicle than to any tire of the vehicle. The junction device may include a fan which can be activated by the switch device to cause hot air from the engine to be drawn into the piping. The junction device may further include a temperature device which monitors the temperature at the first opening of the piping.

20 Claims, 2 Drawing Sheets

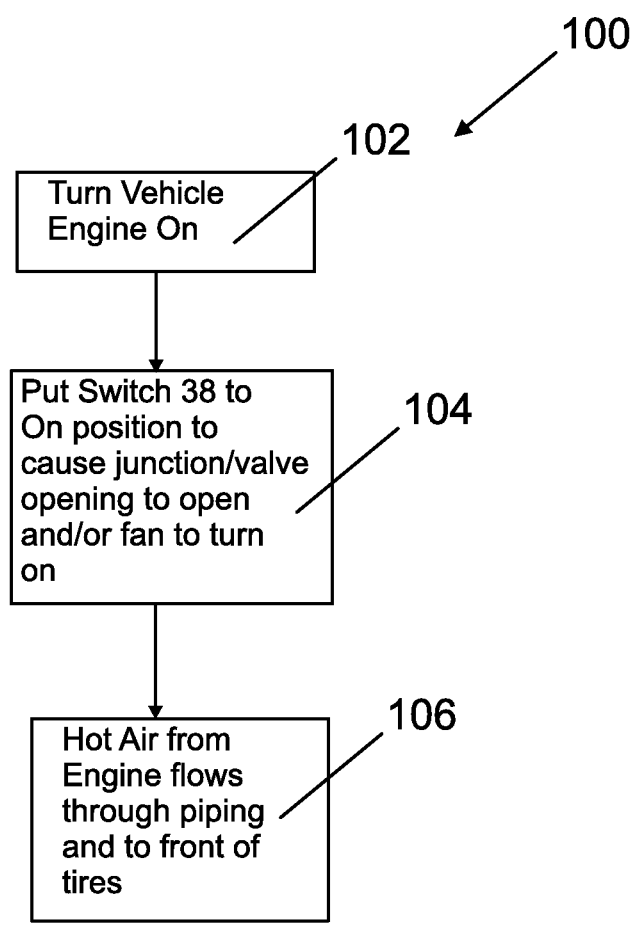

METHOD AND APPARATUS FOR MELTING SNOW OR ICE NEAR TIRES

FIELD OF THE INVENTION

This invention relates to improved methods and apparatus concerning safety systems for vehicles.

BACKGROUND OF THE INVENTION

When there is snow or ice on the road, the tires of a vehicle, such as an automobile begin to accumulate ice and/or snow resulting in loss of traction for the tires. There is a need to eliminate this snow and/or ice to provide better vehicle safety.

SUMMARY OF THE INVENTION

In at least one embodiment an apparatus is provided comprising piping, a junction device connected to a first opening of the piping, and a switch device which is configured to cause the junction device to open or close the first opening of the piping. The apparatus may further include means for attaching the piping, the junction device, and the switch device to a vehicle such that a second opening of the piping is located nearer a first tire of the vehicle than to any other tire of the vehicle, and the first opening of the piping is located nearer an engine of the vehicle than to any tire of the vehicle. The means for attaching the piping may include any known means or combination of means for attaching piping, such as clamps, bolts, screws, adhesives, and/or any other known means for attaching gas piping or plumbing piping. The means for attaching the piping may attach the piping to the underside of a vehicle, such as to the underside of a frame of a vehicle, such as an automobile. The means for attaching the junction device may include any similar known means. The means for attaching the switch device may include, for example any known means for attaching a dashboard component to a vehicle dashboard.

In at least one embodiment, the junction device includes a fan which can be activated by the switch device to cause hot air from the engine to be drawn into the piping. The junction device may further include a temperature device which monitors the temperature at the first opening of the piping.

The piping may also have third, fourth, and fifth openings; and the means for attaching the piping, the junction device, and the switch device to the vehicle may do so in a manner such that the third opening of the piping is located nearer a second tire of the vehicle than to any other tire of the vehicle, the fourth opening of the piping is located nearer a third tire of the vehicle than to any other tire of the vehicle, and the fifth opening of the piping is located nearer a fourth tire of the vehicle than to any other tire of the vehicle.

The apparatus may include the vehicle itself. The vehicle may be an automobile. The means for attaching the piping, the junction device, and the switch device to the vehicle may attache the piping to an underside of the vehicle. The means for attaching the piping, the junction device, and the switch device to the vehicle may attach the switch device to a dashboard of the vehicle.

In at least one embodiment a method is provided which includes attaching piping, a junction device, and a switch device to a vehicle such that a second opening of the piping is located nearer a first tire of the vehicle than to any other tire of the vehicle, and a first opening of the piping is located nearer an engine of the vehicle than to any tire of the vehicle; and wherein the switch device is configured to cause the junction device to open or close the first opening of the piping. The junction device may include a fan which can be activated by the switch device to cause hot air from the engine to be drawn into the piping. The junction device may include a temperature device which monitors the temperature at the first opening of the piping.

The piping may additionally have third, fourth, and fifth openings; and the piping, the junction device, and the switch device may be attached to the vehicle in a manner such that the third opening of the piping is located nearer a second tire of the vehicle than to any other tire of the vehicle, the fourth opening of the piping is located nearer a third tire of the vehicle than to any other tire of the vehicle, and the fifth opening of the piping is located nearer a fourth tire of the vehicle than to any other tire of the vehicle.

BRIEF DESCRIPTION OF THE DRAWINGS

FIG. 2 shows a flow chart in accordance with a method of an embodiment of the present invention.

DETAILED DESCRIPTION OF THE DRAWINGS

Figure 1:
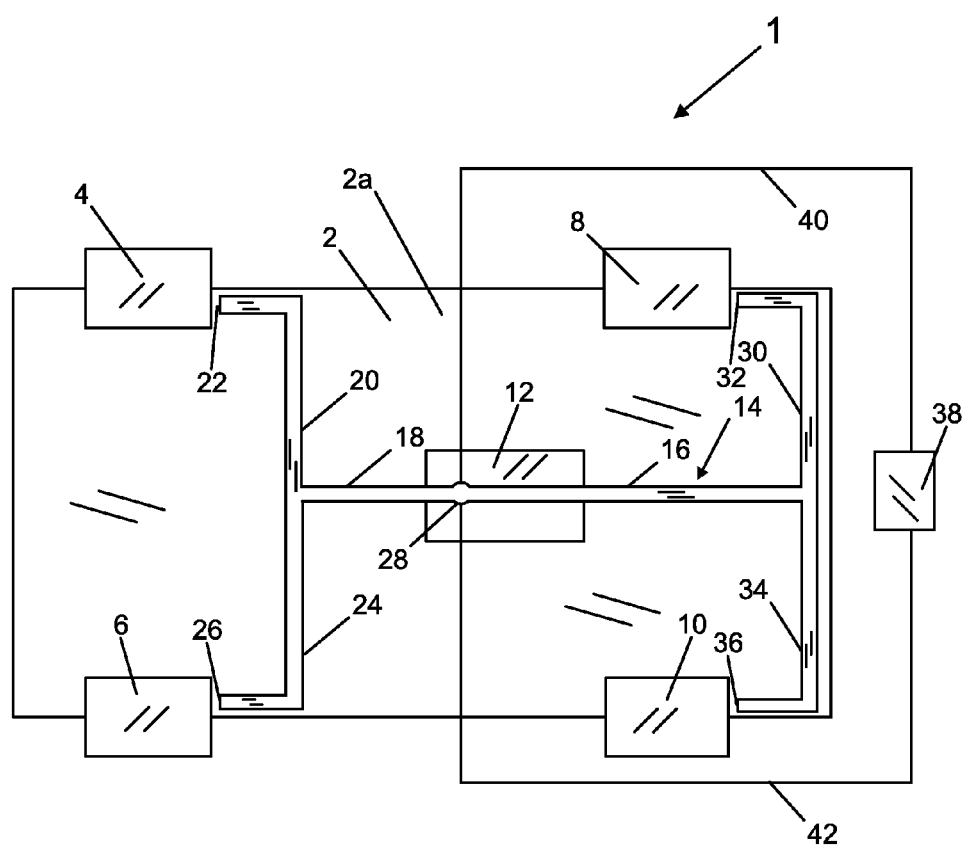
FIG. 1 shows simplified block diagram of a view underneath a vehicle of an apparatus in accordance with an embodiment of the present invention.

FIG. 1 shows simplified block diagram of a view underneath a vehicle of an apparatus 1 in accordance with an embodiment of the present invention. The apparatus 1, includes the vehicle 2, tires 4, 6, 8, and 10, engine 12, pipe system, insulated pipe system, or piping 14, and switch device 38. The piping 14 includes a plurality of right cylindrical hollow tubes or pipes, such as known plumbing piping or gas piping, as well as pipe connectors to increase length, and proper pipe fitting attachments for mounting to engine 12 and to areas in front of tires 4, 6, 8, and 10. The piping 14 includes pipes 16, 18, 20, 24, 30, and 34. The pipes 20, 24, 30, and 34 have openings 22, 26, 32, and 36 respectively.

The piping 14 also includes junction device 28. The junction device 28 may include a valve and/or an opening. The junction device 28 may include a fan. The piping 14 is configured so that hot air from the engine 12 can flow into the piping 14 through the junction device 28, when the junction device 28 is open, such as when a valve of the junction device 28 is open or turned on. The switch device 38 may include an on off switch which may be placed in an "on" position to open the junction device 28 and/or valve to allow hot air from the engine 12 to enter into the piping 14 through the junction device 28, and the on-off switch of the switch device 38 may, in at least one embodiment, control a fan which is part of the junction device 28, wherein the fan of the junction device 28 is configured to draw in hot air from the engine 12 into the junction device 28 and into the piping 14 for distribution to the areas in front of the tires 4, 6, 8, and 10.

After the hot air flows into the open junction device 28, a first part of the hot air goes into pipe 18 and a second part of the hot air goes into pipe 16. The first part of the hot air in pipe 18 then splits up into a first subpart which goes into pipe 20 and a second subpart which goes into pipe 24. The hot air from pipes 20 and 24 then flows out openings 22 and 26, in front of the tires 4 and 6, respectively. The hot air from pipes 30 and 34 flows out openings 32 and 36, in front of the tires 8 and 10, respectively. The hot air from openings 22, 26, 32, and 36 causes ice or snow on the tires 4, 6, 8, and 10 to melt, and also causes snow or ice in front of the tires 4, 6, 8, and 10 to melt. This helps to provide better traction for tires 4, 6, 8, and 10, and overall better safety for the vehicle 2.

The piping 14 may be mounted or fixed in any manner to the underside 2a of the vehicle 2, such as by nuts and bolts, straps, brackets, and/or screws, and/or in any other known manner. The switch device 38 may be attached and/or located on the dashboard of the vehicle 2, inside of the vehicle so that a driver of the vehicle 2 can easily turn the switch device 38 on or off. The switch device 38 may be electrically connected by communications links and/or wires 40 and 42 to the junction device 28. The switch device 38 may be wirelessly connected to the junction device 28, so that links 40 and 42 are or are replaced by wireless communication links.

FIG. 2 shows a flow chart 100 in accordance with a method of an embodiment of the present invention. At step 102 the vehicle 2 is turned on, such as by turning a key of the vehicle 2 or in any known manner, to turn the engine 12 on. At step 104, the switch device 38 is put in the on position to cause junction and/or valve device 28 to open and/or a fan of the junction device 28 to turn on. If the junction device 28 includes a fan, the fan will blow or draw the hot air from the engine 12 through the piping 14 and out the openings 22, 26, 32, and 36, in front of the tires 4, 6, 8, and 10. In FIG. 1, the tires 8 and 10 are the front tires and the tires 4 and 6 are the rear tires. Generally, at step 106, hot air from the engine 12 flows through piping 14 and to the front of the tires 4, 6, 8, and 10. A fan for the junction device 28 may aid in this process, but a fan is not required for the junction device 28.

Generally speaking, the piping 14 may be mounted and/or configured so that the heat from the engine 12 may be taken and/or received by the junction device 28 from the bottom of the engine 12.

It is understood that this invention can apply to any moving vehicle. There are at least two types of installation one or more embodiments of the present invention: (a) installation on new vehicles, and (b) installation on existing vehicles through a kit which is configured to hold necessary parts for an owner to install the piping 14, junction device 28, and links 40 and 42 and switch device 38 on an existing vehicle. One or more embodiments of the present invention can be configured to any vehicle. However, the dimensions of piping 14 length and also pipe fittings that attaches piping 14 to engine 12 may change to accommodate all models of vehicles, such as all models of automobile vehicles.

The junction device 28 may include a temperature sensor. The links 40 and 42 may include wiring which provides information from a temperature sensor which may be part of the junction device 28. The switch device 38 may include a temperature display or readout showing the temperature at the entrance to the junction device 28, and a temperature knob which may cause closure or partial closure of a valve of the junction device 28 to adjust the temperature by taking in less or more heat from the engine 12. The switch device 38 may include an on off switch and a light which is lit when the on off switch is on and is not lit when the on off switch is not on. The on off switch may control a fan of the junction device 28 and/or the opening and closing of a valve of the junction device 28. The switch device 38 may be fully or partially located on the dashboard of a vehicle for access by a driver of the vehicle. The switch device 38 may be implemented in any known manner, such as through an electronic switch or through a touch screen computer display device.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. An apparatus comprising:
   piping;
   a junction device connected to a first opening of the piping;
   a switch device which is configured to cause the junction device to open or close the first opening of the piping;
   and means for attaching the piping, the junction device, and the switch device to a vehicle having a front and an opposing rear, such that a second opening of the piping is located nearer a first tire of the vehicle, at the front of the vehicle, than to any other tire of the vehicle, a third opening of the piping is located nearer a second tire of the vehicle, at the rear of the vehicle, than to any other tire of the vehicle, and the first opening of the piping is located nearer an engine of the vehicle than to any tire of the vehicle;
   wherein each of the first opening of the piping and the junction device overlap the engine along a length from the front of the vehicle to the opposing rear of the vehicle;
   wherein the piping includes at least a first pipe and a second pipe;
   wherein the first pipe has a first end and a second end;
   wherein the first end of the first pipe overlaps the engine along the length from the front of the vehicle to the opposing rear of the vehicle, and is connected to the first opening;
   wherein the second end of the first pipe is located nearer the front of the vehicle than the rear of the vehicle;
   wherein the second pipe has a first end and a second end;
   wherein the first end of the second pipe overlaps the engine along the length from the front of the vehicle to the opposing rear of the vehicle, and is connected to the first opening;
   wherein the second end of the second pipe is located nearer the rear of the vehicle than the front of the vehicle;
   wherein the first pipe and the second pipe are configured so that when the first opening of the piping is open, hot air from the engine flowing into the first opening splits into a first part of hot air flowing into the first pipe and a second part of hot air flowing into the second pipe;
   wherein the first part of hot air flows from the first end of the first pipe, through the first pipe, and at least partially out the second opening of the piping at the second end of the first pipe to cause snow or ice on the first tire to melt;
   wherein the second part of hot air flows from the first end of the second pipe, through the second pipe, and at least partially out the third opening of the piping at the second end of the second pipe to cause snow or ice on the second tire to melt;
   wherein the second and third openings face towards the first and second tires, and are unobstructed from the first and second tires, respectively;
   wherein the second opening is between the first tire and the front of the vehicle; and
   wherein the third opening is between the first tire and the second tire.

2. The apparatus of claim 1 wherein
   the junction device includes a fan which can be activated by the switch device to cause hot air from the engine to be drawn into the piping.

3. The apparatus of claim 1 wherein
   the junction device includes a temperature device which monitors the temperature at the first opening of the piping.

4. The apparatus of claim 1 wherein
the piping has fourth, and fifth openings; and
and wherein the means for attaching the piping, the junction device, and the switch device to the vehicle do so in a manner such that the fourth opening of the piping is located nearer a third tire of the vehicle, at the front of the vehicle, than to any other tire of the vehicle, and the fifth opening of the piping is located nearer a fourth tire of the vehicle, at the rear of the vehicle, than to any other tire of the vehicle;
wherein the first tire and the second tire are on a first side of the vehicle;
wherein the third tire and the fourth tire are on a second side of the vehicle;
wherein the first side of the vehicle is opposite the second side of the vehicle;
wherein the first pipe has a third end at which the fourth opening of the piping is located;
wherein the second pipe has a third end at which the fifth opening of the piping is located;
wherein the first pipe includes a first branch and a second branch;
wherein the second pipe includes a first branch and a second branch;
wherein the first part of hot air flowing into the first pipe flows from the first end of the first pipe, splits into a first part, first subpart of hot air flowing into the first branch of the first pipe and out the second opening of the first pipe to cause snow or ice on the first tire to melt, and a first part, second subpart of hot air flowing into the second branch of the first pipe and out the fourth opening of the first pipe to cause snow or ice on the third tire to melt;
wherein the second part of hot air flowing into the second pipe flows from the first end of the second pipe, splits into a second part, first subpart of hot air flowing into the first branch of the second pipe and out the third opening of the second pipe to cause snow or ice on the second tire to melt, and a second part, second subpart of hot air flowing into the second branch of the second pipe and out the fifth opening of the second pipe to cause snow or ice on the fourth tire to melt;
and wherein the fourth, and fifth openings face towards the third, and fourth tires, and are unobstructed from the third and fourth tires, respectively;
wherein the fourth opening is between the third tire and the front of the vehicle; and
wherein the fifth opening is between the third tire and the fourth tire.

5. The apparatus of claim 4 wherein
the piping is configured so that the first opening, when open, receives hot air from a bottom of the engine, and this hot air from the bottom of the engine flows through the piping and partially out each of the second, third, fourth, and fifth openings.

6. The apparatus of claim 1 further comprising
the vehicle.

7. The apparatus of claim 6 wherein
the vehicle is an automobile.

8. The apparatus of claim 1 wherein
the means for attaching the piping, the junction device, and the switch device to the vehicle attaches the piping to an underside of the vehicle.

9. The apparatus of claim 1 wherein
the means for attaching the piping, the junction device, and the switch device to the vehicle attaches the switch device to a dashboard of the vehicle.

10. The apparatus of claim 1 wherein
the piping is configured so that the first opening, when open, receives hot air from a bottom of the engine, and this hot air from the bottom of the engine flows through the piping and partially out the second opening, and partially out the third opening.

11. The apparatus of claim 1 wherein
the switch device causes partial closure of a valve of the junction device to adjust the amount of heat taken into the junction device from the engine.

12. A method comprising:
attaching piping, a junction device, and a switch device to a vehicle, having a front and an opposing rear, such that a first opening of the piping is located nearer an engine of the vehicle than to any tire of the vehicle, a second opening of the piping is located nearer a first tire of the vehicle, at the front of the vehicle, than to any other tire of the vehicle, and a third opening of the piping is located nearer a second tire of the vehicle, at the rear of the vehicle, than to any other tire of the vehicle;
wherein the switch device is configured to cause the junction device to open or close the first opening of the piping; and
wherein each of the first opening of the piping and the junction device overlap the engine along a length from the front of the vehicle to the rear of the vehicle;
wherein the piping includes at least a first pipe and a second pipe;
wherein the first pipe has a first end and a second end;
wherein the first end of the first pipe overlaps the engine along the length from the front of the vehicle to the rear of the vehicle, and is connected to the first opening;
wherein the second end of the first pipe is located nearer the front of the vehicle than the rear of the vehicle;
wherein the second pipe has a first end and a second end;
wherein the first end of the second pipe overlaps the engine along the length from the front of the vehicle to the opposing rear of the vehicle, and is connected to the first opening;
wherein the second end of the second pipe is located nearer the rear of the vehicle than the front of the vehicle;
wherein the first pipe and the second pipe are configured so that when the first opening of the piping is open, hot air from the engine flowing into the first opening splits into a first part of hot air flowing into the first pipe and a second part of hot air flowing into the second pipe;
wherein the first part of hot air flows from the first end of the first pipe, through the first pipe, and out the second opening of the piping at the second end of the first pipe to cause snow or ice on the first tire to melt;
wherein the second part of hot air flows from the first end of the second pipe, through the second pipe, and out the third opening of the piping at the second end of the second pipe to cause snow or ice on the second tire to melt;
wherein the second, and third openings face towards the first and second tires and are unobstructed from the first and second tires, respectively;
wherein the second opening is between the first tire and the front of the vehicle; and
wherein the third opening is between the first tire and the second tire.

13. The method of claim 12 wherein
the junction device includes a fan which can be activated by the switch device to cause hot air from the engine to be drawn into the piping.

14. The method of claim 12 wherein
the junction device includes a temperature device which monitors the temperature at the first opening of the piping; and
wherein the switch device causes partial closure of a valve of the junction device to adjust the amount of heat taken into the junction device from the engine.

15. The method of claim 12 wherein
the piping has fourth, and fifth openings; and
and the piping, the junction device, and the switch device are attached to the vehicle in a manner such that the fourth opening of the piping is located nearer a third tire of the vehicle, at the front of the vehicle, than to any other tire of the vehicle, and the fifth opening of the piping is located nearer a fourth tire of the vehicle, at the rear of the vehicle, than to any other tire of the vehicle;
wherein the first tire and the second tire are on a first side of the vehicle;
wherein the third tire and the fourth tire are on a second side of the vehicle;
wherein the first side of the vehicle is opposite the second side of the vehicle;
wherein the first pipe has a third end at which the fourth opening of the piping is located;
wherein the second pipe has a third end at which the fifth opening of the piping is located;
wherein the first pipe includes a first branch and a second branch;
wherein the second pipe includes a first branch and a second branch;
wherein the first part of hot air flowing into the first pipe flows from the first end of the first pipe, splits into a first part, first subpart of hot air flowing into the first branch of the first pipe and out the second opening of the first pipe to cause snow or ice on the first tire to melt, and a first part, second subpart of hot air flowing into the second branch of the first pipe and out the fourth opening of the first pipe to cause snow or ice on the third tire to melt;
wherein the second part of hot air flowing into the second pipe flows from the first end of the second pipe, splits into a second part, first subpart of hot air flowing into the first branch of the second pipe and out the third opening of the second pipe to cause snow or ice on the second tire to melt, and a second part, second subpart of hot air flowing into the second branch of the second pipe and out the fifth opening of the second pipe to cause snow or ice on the fourth tire to melt;
wherein the fourth, and fifth openings face towards the third, and fourth tires, and are unobstructed from the third and fourth tires, respectively;
wherein the second opening is between the first tire and the front of the vehicle; and
wherein the third opening is between the first tire and the second tire.

16. The method of claim 15 wherein
the piping is configured so that the first opening, when open, receives hot air from a bottom of the engine, and this hot air from the bottom of the engine flows through the piping and partially out each of the second, third, fourth, and fifth openings.

17. The method of claim 12 wherein
the vehicle is an automobile.

18. The method of claim 12 wherein
the piping is attached to an underside of the vehicle.

19. The method of claim 12 wherein
the switch device is attached to a dashboard of the vehicle.

20. The method of claim 12 wherein
the piping is configured so that the first opening, when open, receives hot air from a bottom of the engine, and this hot air from the bottom of the engine flows through the piping and partially out the second opening, and partially out the third opening.

* * * * *